United States Patent
Mason

(10) Patent No.: US 10,212,189 B2
(45) Date of Patent: Feb. 19, 2019

(54) AUTHENTICATION OF CLIENT DEVICES USING MODIFIED IMAGES

(71) Applicant: salesforce.com, inc., San Francisco, CA (US)

(72) Inventor: Paul Anthony Mason, Port Talbot (GB)

(73) Assignee: SALESFORCE.COM, INC., San Francisco, CA (US)

( * ) Notice: Subject to any disclaimer, the term of this patent is extended or adjusted under 35 U.S.C. 154(b) by 99 days.

(21) Appl. No.: 15/290,367

(22) Filed: Oct. 11, 2016

(65) Prior Publication Data

US 2018/0103050 A1    Apr. 12, 2018

(51) Int. Cl.
     *H04L 29/06*      (2006.01)

(52) U.S. Cl.
     CPC ...... *H04L 63/1483* (2013.01); *H04L 63/1416* (2013.01); *H04L 63/168* (2013.01)

(58) Field of Classification Search
     CPC ............ H04L 63/1425; H04L 63/1483; H04L 63/0428; H04L 63/0823; H04L 63/083; H04L 63/0861
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,133 B1 | 4/2001 | Masthoff | |
| 6,216,135 B1 | 4/2001 | Brodersen et al. | |
| 6,233,617 B1 | 5/2001 | Rothwein et al. | |
| 6,236,978 B1 | 5/2001 | Tuzhilin | |
| 6,266,669 B1 | 7/2001 | Brodersen et al. | |
| 6,288,717 B1 | 9/2001 | Dunkle | |
| 6,295,530 B1 | 9/2001 | Ritchie et al. | |
| 6,324,568 B1 | 11/2001 | Diec et al. | |

(Continued)

*Primary Examiner* — Mahfuzur Rahman
(74) *Attorney, Agent, or Firm* — Schwabe Williamson & Wyatt

(57) ABSTRACT

Systems and methods for detecting phishing attacks and identifying attackers are described. In embodiments, a server system may modify a template image based on user information and provide the modified image to a user system with a login page. The server system may obtain authentication credentials with an image rendered by the user system. The server system may authenticate the user system based on the authentication credentials and information included in the rendered image. Other embodiments may be described and/or claimed.

19 Claims, 8 Drawing Sheets

(56) References Cited

U.S. PATENT DOCUMENTS

| | | |
|---|---|---|
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0127331 A1* | 5/2008 | Seidman ............... G06Q 10/10 726/21 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0215270 A1* | 8/2010 | Manohar ............... G06F 21/36 382/177 |
| 2011/0066685 A1* | 3/2011 | Kitada ............... H04L 51/08 709/206 |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |

(56) References Cited

U.S. PATENT DOCUMENTS

| | | |
|---|---|---|
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0344716 A1* | 11/2014 | Martin .................. G06Q 50/01 715/753 |
| 2014/0359537 A1 | 12/2014 | Jackobson et al. |
| 2015/0113441 A1* | 4/2015 | Felt ........................ G06T 11/60 715/753 |
| 2016/0044025 A1* | 2/2016 | Goyal .................. H04L 63/083 726/6 |

* cited by examiner

AUTHENTICATION OF CLIENT DEVICES USING MODIFIED IMAGES

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to driving customer service interactions on social media.

BACKGROUND

Phishing is an attempt by an attacker to obtain sensitive information by masquerading as a trustworthy entity during electronic communications. Typically, an attacker will pretend to be a representative or agent of a service provider. More recently, phishing attacks may involve website forgery or some form of man-in-the-middle (MiM) attack, where an attacker alters or clones a service provider's webpage, such as a login page, to capture authentication credentials (e.g., a user name and password) of one or more clients that enter their authentication credentials into the cloned webpage. In such cases, an attacker may gain access to the client's sensitive information within the service provider's system by relaying the client's authentication credentials, which were obtained through the cloned webpage, to the service provider.

In some cases, the service provider may use secure communications session, such as Hypertext Transfer Protocol (HTTP) over Transport Layer Security (TLS), to provide client's access to various services. HTTP over TLS (also referred to as "HTTPS") relies on a public key infrastructure (PKI) mutual authentication scheme whereby the client and the service provider mutually validate certificates issued by a common certificate authority. However, in some cases, an attacker may obtain a client's certificate via the cloned website and pass the client's certificate to the service provider along with the obtained authentication credentials. In other cases, the attacker may replace the client's certificate with his own certificate and perform the various authentication/handshake procedures using his own certificate.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
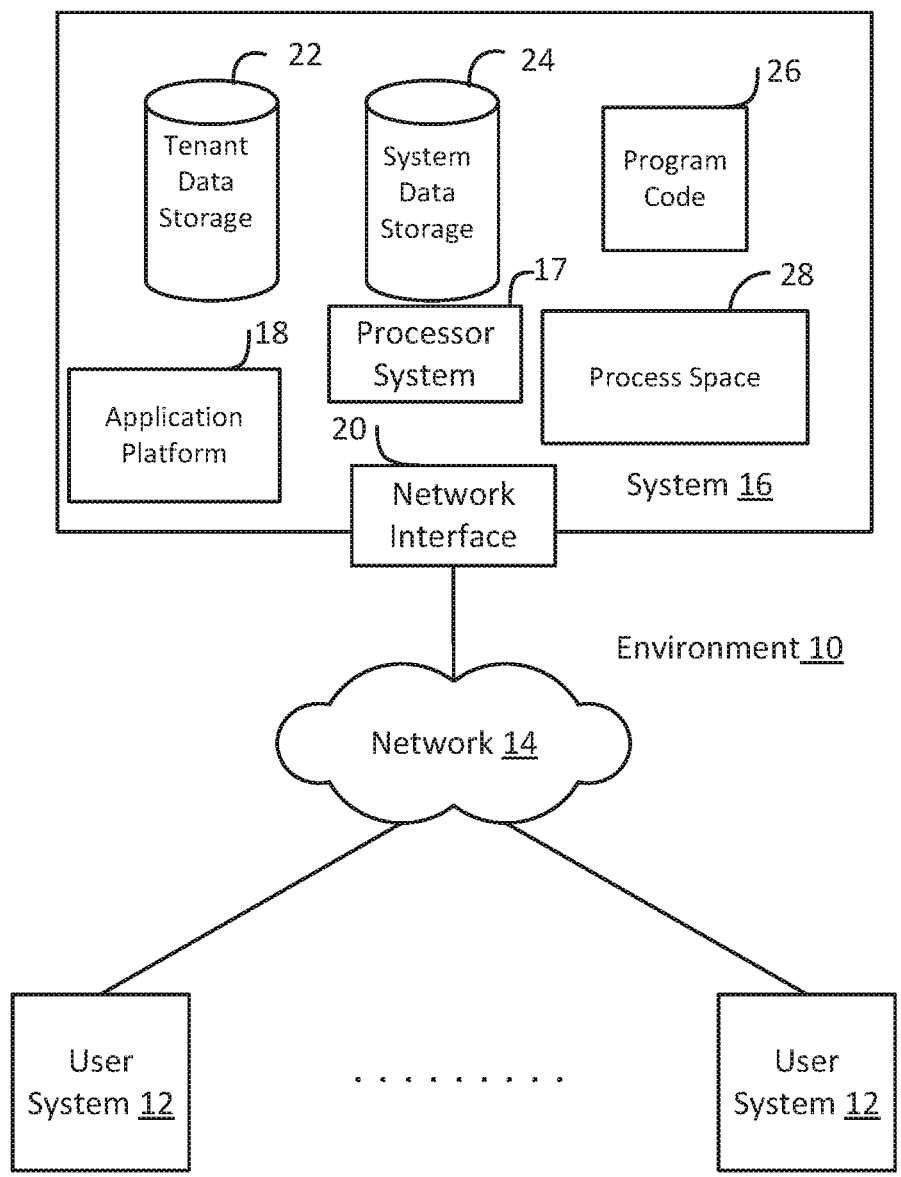
FIG. 1A shows a block diagram of an example environment in which an on-demand database service can be used according to some implementations.

Embodiments discussed herein are directed to protecting clients against phishing attacks and man-in-the-middle (MiM) attacks, where an attacker intercepts and relays communications between the client and a server system using a cloned version of the server system's login page. These attacks typically involve an attacker will visiting and downloading a website. The attacker clones the website and then hosts the cloned website. The attacker will provide the URL of the cloned website to clients, who will input authentication credentials to the cloned website. The cloned website will pass the authentication credentials to the server system, and will obtain user data from the server system. The attacker can then store the user data and then pass the user information to the client. In this way, the client and server system believe they are directly communicating with each other while the attacker steals sensitive data.

Various embodiments protect against such attacks by using a user-specific image for authentication in addition to a client's authentication credentials. The user-specific image is a generic image that is embedded with user information that is obtained when the client device requests the login page of the server system. In embodiments, the image may be embedded with the user information by a stenographic procedure and/or during a compression operation.

For example, when a client device requests a login page of the server system, the server system may obtain user information, such as an internet protocol (IP) address associated with the client device, a browser type used by the client device to request the login page, an operating system (OS) used by the client device, and/or other like information. The server system may convert this information into a number or series of bits, and embed this number into a generic or template image that is to be rendered with the login page, such as a logo associated with the service provider. In some embodiments, the number may be embedded into the template image by changing the least significant bit of a color value of each pixel in the template image to correspond with a bit in the number. In other embodiments, the number may be embedded into the template image during a compression operation, where a least significant bit of a plurality of transform coefficients is changed to correspond with a bit in the number. The altered image may be referred to as a "user specific image." In these ways, the template image may be altered to a degree that is imperceptible by the human eye. The client device may obtain the user specific image when rendering the login page in a browser or application container of the client device. The login page may allow the client device to provide authentication credentials to the server system. In various embodiments, the server system may obtain the user specific image with authentication credentials. In various embodiments, in addition to performing a typical authentication procedure with the authentication credentials, the server system may determine whether the obtained image matches the user specific image provided to the client device with the login page. In embodiments, the server system may verify that the authentication credentials as originating from the client device when the images match.

When an attacker clones the server system's login page for phishing purposes, the attacker will typically request the login page, and the server system may return the login page with a modified image based on the attacker's information (also referred to as an "attacker specific image"). The attacker will then serve the cloned login page to the client device with the attacker specific image. When the client device attempts to login using the cloned login page, the client device authentication credentials will be sent to the attacker, who will then forward this information to the server system. As discussed previously, the server system may validate the client device by matching the image data obtained with the authentication credentials and the image data sent with the login page. When the login page is cloned, these two sets of image data will not match thereby indicating a login threat. In various embodiments, when a login threat is identified, the server system may extract the identifying information (e.g., IP address) from the image data obtained with the authentication credentials to locate and/or identify the attacker.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring of the disclosed implementations. Other implementations and applications are also possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A. B or C" is intended to include the possibilities of "A," "B." "C." "A and B," "B and C," "A and C" and "A. B and C."

Some implementations described and referenced herein are directed to systems, apparatus, computer-implemented methods and computer-readable storage media for identifying articles helpful in resolving user queries.

A database system might display a case associated with a customer support query. The database system may initiate a search for other cases related to the new case. The database system may extract relevant terms from the title and/or description provided in the new case using a term weighting algorithm, such as more like this (MLT). The relevant terms are then used in a search query for identifying the related cases.

The database system identifies articles linked to the related cases, ranks the articles, and causes the articles to be displayed on a remote user system in an order based on the ranking. The database system may rank the articles based on a number of related cases linked to the articles. The database system also may rank the article based on other parameters, such as relevancy scores for the related cases, labels assigned to the cases, last modified dates of the related cases, etc.

The database system may identify more relevant articles by first finding related cases that use a similar vocabulary to describe similar customer problems. The database system then identifies the articles that were previously determined to help resolve the prior problems. Thus, the database system may bridge the gap between vocabularies used by customers to describe problems and vocabularies used in articles to describe solutions to those problems.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

FIG. 1A shows a block diagram of an example of an environment 10 in which an on-demand database service can be used in accordance with some implementations. The environment 10 includes user systems 12, a network 14, a server system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the server system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform. Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP. HTTP, HTTPS. Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX any other scripting language, such as VBScript, and many other programming languages as are well known may be used. (Java™ is a trademark of Sun Microsystems, Inc.).

Figure 1B:
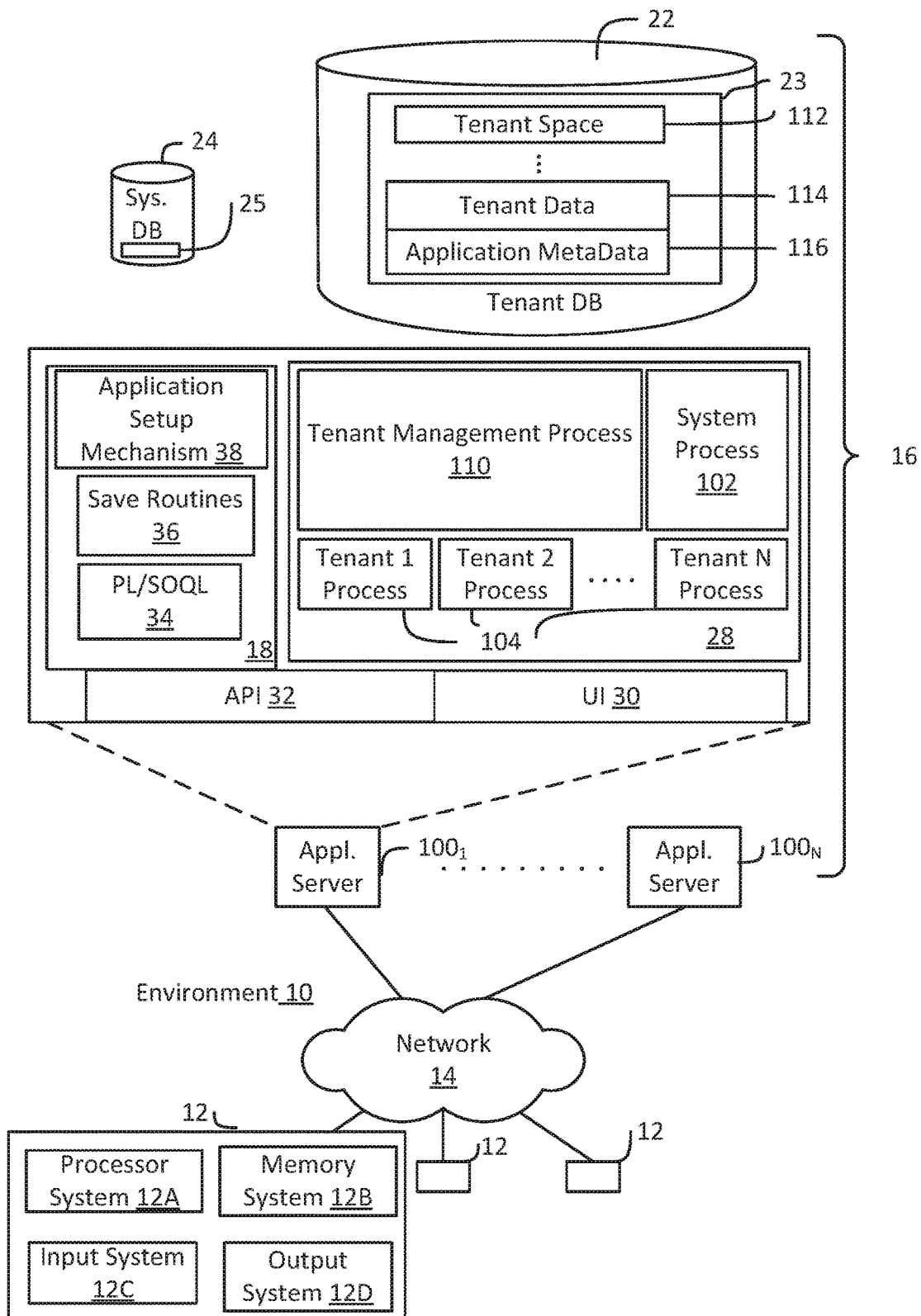
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
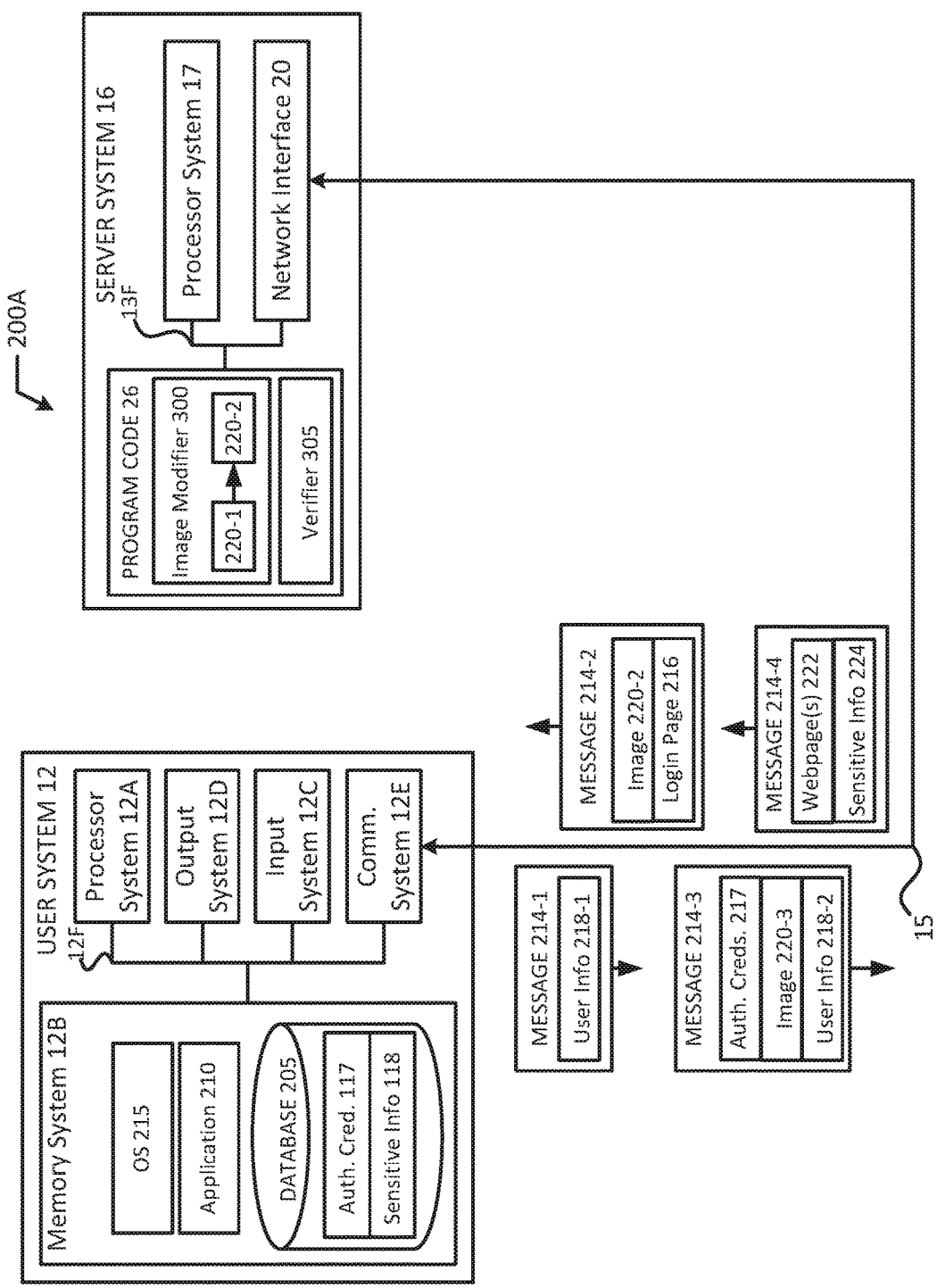
FIG. 2A shows an arrangement in which the components of a user system interact with components of the server system, in accordance with various example embodiments.
Figure 2B:
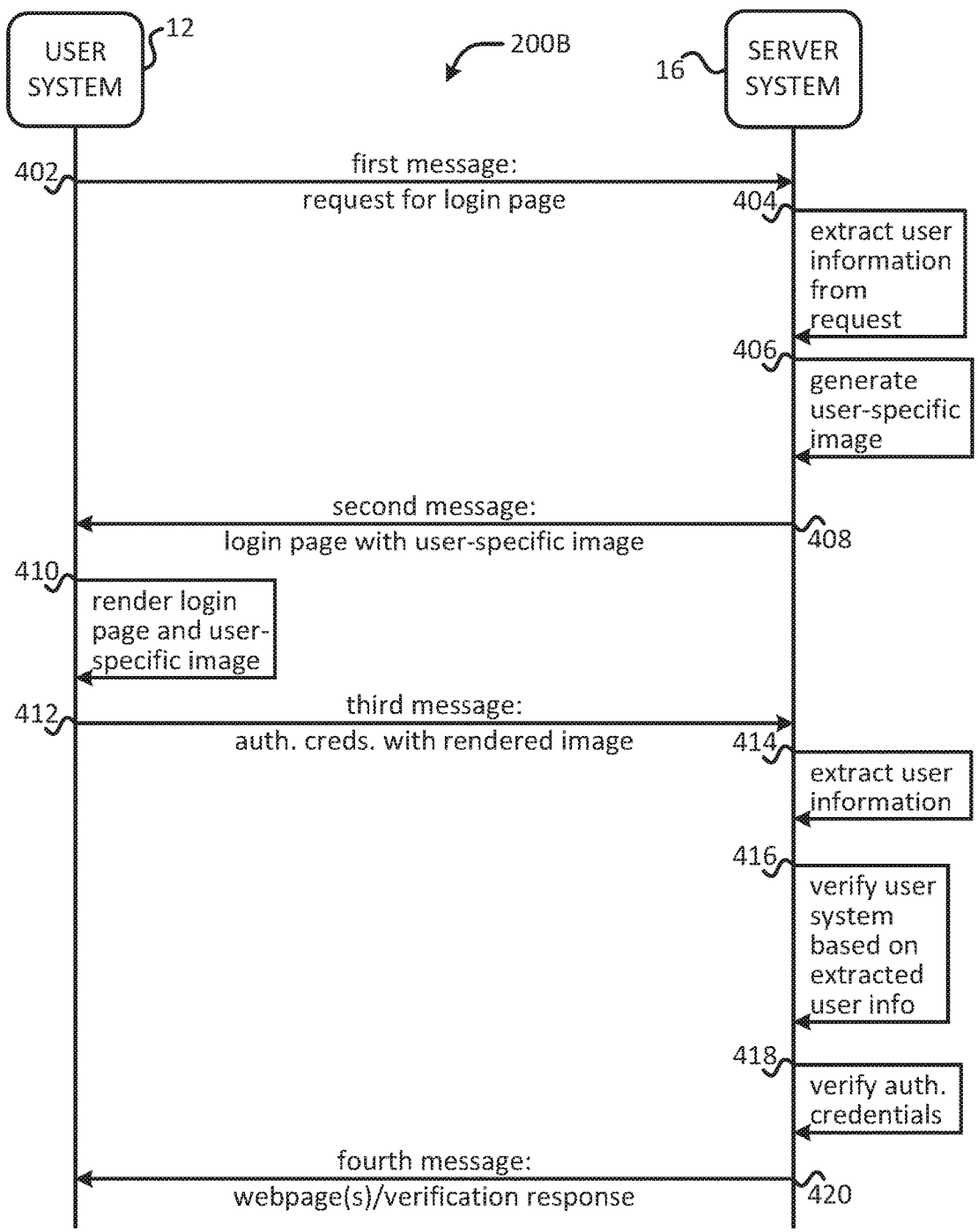
FIG. 2B illustrates a process for authenticating a user system in the arrangement of FIG. 2A, in accordance with various embodiments.

FIG. 2A shows an arrangement 200A in which the components of a user system 12 interact with components of the server system 16, in accordance with various example embodiments. Referring to the user system 12 in FIG. 2A, the user system 12 may include a communications system 12E in addition to the processor system 12A, the memory system 12B, the input system 12C, and the output system 12D discussed previously with regard to FIGS. 1A and 1B. The components of user system 12 may be coupled with each other by bus 12F at least as shown by FIGS. 2A and 2B.

During operation, the memory system 12B may include operating system (OS) 215, database (DB) 205, and application 210. OS 215 may manage computer hardware and software resources, and provide common services for applications of the user system 12. OS 215 may include one or more drivers and/or APIs that provide an interface to hardware devices thereby enabling OS 215 and application 210 to access hardware functions without needing to know the details of the hardware itself. In some embodiments, the OS 215 may include middleware that may connect two or more separate applications or connect applications with underlying hardware components beyond those available from OS 215 and/or the drivers/APIs. The OS 215 may be a general purpose operating system or an operating system specifically written for and tailored to the user system 12.

The application 210 may be a software application designed to run on the user system 12, such as when the user system 12 is implemented in a mobile device, such as a smartphone, tablet computer, and the like. Program code and/or software modules of the application 210 may be executed by the processor system 12A. The application 210 may be a native application, a web application, or a hybrid application.

Native applications may be used for operating the user system 12, and may be platform or OS specific. In embodiments where the application 210 is implemented as a native application, the application 210 may include a container for rendering application-specific webpages in the container. Web applications are applications that load into a web browser of the user system 12 in response to requesting the web application from a service provider (e.g., a web server that may be associated with server system 16). Web applications may be any server-side application that is developed with any server-side development tools and/or programming languages, such as PHP, Node.js, ASP.NET, and/or any other like technology that renders Hypertext Markup Language (HTML). Hybrid applications may be a hybrid between native applications and web applications. Hybrid applications may be a standalone skeleton or other like application container that may load a website within the application container. Hybrid applications may be written using website development tools and/or programming languages, such as HTML5, Cascading Stylesheets (CSS), JavaScript, and the like. Hybrid applications use a browser engine of the user system 12, without using a web browser of the user system 12, to render a website's services locally. Hybrid applications may also access mobile device capabilities that are not accessible in web applications, such as the one or more sensors, local storage, and the like.

In some embodiments, the owner/operator of server system 16 may have pre-built the application 210 for use by agents of an organization, and a user of the user system 12 may be an agent of the organization. In such embodiments, the user of the user system may use authentication credentials 217 to access organization specific data or other like sensitive information 224 from a tenant space within the server system 16. However, the example embodiments discussed herein may be applicable to any server system capable of authenticating user/client devices to provide one or more services to those user/client devices.

Regardless of whether the application 210 is implemented as a native application, web application, or hybrid application, the processor system 12A implementing the application 210 may be capable of requesting, obtaining, and rendering webpages in an application container or browser, executing tasks or other applications based on the data stored in the DB 205, and/or capable of executing tasks or applications based on instructions received from server system 16. In various embodiments, the processor system 12A implementing the application 210 may be capable of rendering a login page 216 with a user-specific image 220-2, capable of obtaining authentication credentials 217 stored in the DB 205 or via input system 12C, and capable of providing the authentication credentials 217 and the rendered image 220-3 to the server system 16. In response to proper authentication of the user system 12, the processor system 12A implementing the application 210 may be capable of obtaining and rendering webpage(s) 222 that may include sensitive information 224. Furthermore, the processor system 12A implementing the application 210 may be capable of storing the sensitive information 224 and the authentication credentials 217 in the DB 205.

The DB 205 may store a collection of data used by the application 210, such as authentication credentials 217 and sensitive information 224. In various embodiments, the authentication credentials 217 may include any information that is used to authenticate or validate a user's identity, such as a user name, password, personal identification number (PIN), digital certificates, public/private key pairs, biometric data and/or other like information. In embodiments, some of the authentication credentials 217 may be obtained via the input system 12C (e.g., user name, password, PIN, biometric data) and some of the authentication credentials 217 may be stored in the DB 205 (e.g., digital certificates, public/private key pairs, etc.).

Bus 12F may be configured to enable the communication and data transfer between processor system 12A and memory system 12B. Bus 12F may comprise a high-speed serial bus, parallel bus, internal universal serial bus (USB). Front-Side-Bus (FSB), a PCI bus, a PCI-Express (PCI-e) bus, a Small Computer System Interface (SCSI) bus, an SCSI parallel interface (SPI) bus, an Inter-Integrated Circuit (I2C) bus, a universal asynchronous receiver/transmitter (UART) bus, and/or any other suitable communication technology for transferring data between components within user system 12.

Communications system 12E may include circuitry for communicating with a wireless network and/or cellular network. Communications system 12E may be used to establish the networking layer tunnel 15 through which the user system 12 may communicate with the server system 16. Communications system 12E may include one or more processors (e.g., baseband processors, etc.) that are dedicated to a particular wireless communication protocol (e.g., Wi-Fi and/or IEEE 802.11 protocols), a cellular communication protocol (e.g., Long Term Evolution (LTE) and the like), and/or a wireless personal area network (WPAN) protocol (e.g., IEEE 802.15.4-802.15.5 protocols including ZigBee, WirelessHART, 6LoWPAN, etc.; or Bluetooth or Bluetooth low energy (BLE) and the like). The communications system 12E may also include hardware devices that enable communication with wireless networks and/or other user systems 12 using modulated electromagnetic radiation through a non-solid medium. Such hardware devices may include switches, filters, amplifiers, antenna elements, and the like to facilitate the communication OTA by generating or otherwise producing radio waves to transmit data to one or more other devices via the one or more antenna elements, and converting received signals from a modulated radio wave into usable information, such as digital data, which may be provided to one or more other components of user system 12 via bus 12F. To communicate (e.g., transmit/receive) the various messages discussed herein, the user system 12 using the communications system 12E may establish a link 15 (also referred to as "channel 15," 'networking layer tunnel 15," and the like) with network interface 20 of the server system 16.

Referring to the server system 16 shown by FIG. 2A, the server system 16 may include the processor system 17, the network interface 20, and the program code 26 as discussed previously with regard to FIGS. 1A and 1B. The components of server system 16 may be coupled with each other by bus 13F at least as shown by FIGS. 2A and 2B. Bus 13F may be the same or similar as bus 12F discussed previously.

Program code 26 may include an image modifier 300 and a verifier 305 in addition to program code used for implementing the various functions of the server system 16. The program code 26, including program code of the image modifier 300 and the verifier 305, may be executed by the processor system 17. In response to execution of the program code 26, the server system 16 may implement or perform the various tasks, operations, procedures, processes, etc. of the example embodiment discussed herein. For example, execution of the program code 26 may cause the server system 16 to perform the processes 200B, 300B, 400), and 500 discussed with regard to FIGS. 2B, 3B, and 4-5.

In embodiments, the image modifier 300 may modify a template or generic image 220-1 to generate a user-specific image 220-2. The user-specific image 220-2 may have a different color scheme than a color scheme of the template image 220-1. In embodiments, the color scheme of the user-specific image 220-2 may be visually imperceptible and/or indistinguishable (e.g., to the human visual system) from the color scheme of the template image 220-1.

The template image 220-1 may be a logo of the owner/operator of the server system 16 or any other type of image that is to be rendered in/with the login page 216. The template image 220-1 may comprise any suitable file format, such as Joint Photographic Experts Group (JPEG), JPEG File Interchange Format (JFIF) JPEG 2000, Tagged Image File Format (TIFF), Graphics Interchange Format (GIF), Windows Bitmap (BMP), and the like. In some embodiments, the particular format of the template image used to produce the user-specific image 220-2 may be specified by the first message 214-1.

In embodiments, the user-specific image 220-2 may be embedded with, or otherwise include first user information 218-1, which may associated with the user system 12A. The first user information 218-1 (as well as the second and third user information discussed infra) may include an internet protocol (IP) address or other like network address of the user system 12; a type and/or version of the OS 215 implemented by the user system 12; a type and/or version of the application 210; a version and/or type of browser used to send the first message 214-1; a window size of the browser; a type and/or version of a rendering engine implemented by the browser; a vendor/developer of the OS 215, application 210, browser, and/or rendering engine; a time that the request was submitted; a time zone in which the user system 12 is located; a screen or display resolution of the user system 12; a device type of the user system 12; Global Positioning System (GPS) coordinates; and/or any other like information associated with the user system 12.

In various embodiments, the image modifier 300 may obtain the first user information 218-1 from the first message 214-1. For example, the first message 214-1 may be an HTTP message including an HTTP header with a plurality of fields. The image modifier 300 may obtain an IP address of the user system 12 from an X-Forwarded-For (XFF) field of the HTTP header, a time and date that the first message 214-1 was sent from a Date field of the HTTP header, and/or a user agent string contained in a User Agent field of an HTTP header of the first message 214-1. The user agent string may indicate the OS 215 type/version; system information of the user system 12; browser version/type; rendering engine version/type; a device type of the user system 12, etc. Other message types may be used and/or the first user information 218-1 may be obtained by other means.

In addition to (or alternative to) obtaining information from the first message 214-1, the image modifier 300 may determine or derive other types of first user information 218-1 associated with the user system 12. For example, the image modifier 300 may derive a time zone or geolocation in which the user system 12 is located from an obtained IP address. In some embodiments, first user information 218-1 may be sent to the server system 16 when the user system 12 loads or renders the login page 216. For example, the login page 216 may include Javascript or other like code that obtains and sends back information (e.g., in an additional HTTP message) that is not typically included in an HTTP header, such as time zone information, GPS coordinates, screen or display resolution of the user system 12, and/or other like information. Other methods may be used to obtain or derive user information.

Regardless of the specific type of first user information 218-1 used and/or how the first user information 218-1 is obtained, the image modifier 300 may determine or identify a numeric representation of the user information 218. In some embodiments, the image modifier 300 may convert the numeric representation of the first user information 218-1 (referred to as a "user information number"), such as by converting decimal values and/or character strings into a binary number or series of bits. In embodiments, the image modifier 300 may use the user information number to modify the template image 220-1. For example, the image modifier 300 may perform a stenographic procedure to hide the user information number in a numeric representation of the template image 220-1. In another example, the image modifier 300 may encode numerals of the user information number in the template image 220-1 during a compression operation. In this regard, the server system 16 may include an encoder/decoder, which may be implemented as program code 26 (e.g., as a part of, or separate from the image modifier 300) and/or hardware devices.

In various embodiments, the verifier 305 may authenticate the user system 12 based on the rendered image 220-3. For example, in various embodiments, the verifier 305 may extract user information embedded or hidden in the rendered image 220-3 (also referred to as "third user information") and compare the third user information with the second user information 218-2 that was included in the second message 214-2. In such embodiments, the verifier 305 may authenticate or verify the user system 12 if the third user information matches the second user information 218-2.

In embodiments second message 214-2 may be an HTTP message, and the second user information 218-2 may be contained in one or more HTTP header fields and/or an HTTP message body of the second message 214-2. In another embodiment, which may be used in combination with the previous example, second user information 218-2 (e.g., GPS coordinate, time zone information, etc.) may be obtained from the user system 12 and/or derived in a same or similar manner as discussed previously with regard to the first user information 218-1 (e.g., using scripts in the login page 216 and the like). In another embodiment, which may be used in combination with the previous examples, the second user information 218-2 may be included in or with the authentication credentials 217, such as when the authentication credentials include a digital certificate and the like. Furthermore, the verifier 305 may also authenticate/verify the user system 12 by performing other authentication procedures using the authentication credentials 217 (e.g., matching a provided user name, password, biometric data with stored username, password, biometric data; asymmetric key agreement algorithms; and the like).

FIG. 2A illustrates various components of user system 12 and server system 16, however in some embodiments, user system 12 and/or server system 16 may include many more components than those shown in FIGS. 1A, 1B, and 2A. For example, in some embodiments, the user system 12 may include a display module (as part of the output system 12D, for example), an input/output (I/O) interface (as part of the input system 12C, for example), a power management integrated circuit (PMIC), network interface controller, one or more sensors (e.g., an image sensor or camera, one or more biometric sensors, gyroscope sensors, accelerometers, gravimeters, compass/magnetometers, altimeters, barometers, proximity sensors, ambient light sensors, thermal sensors, ultrasonic transceivers, and/or positioning circuitry such a GPS) modules, and/or other like components).

FIG. 2B illustrates a process 200B for authenticating a user system 12, in accordance with various embodiments. For illustrative purposes, the operations of process 200B are described as being performed by the elements of the user system 12 and the server system 16 in arrangement 200A of FIG. 2A. Referring to FIGS. 2A and 2B, the process 200B may operate as follows.

At operation 402, the processor system 12A may implement the application 210 to send the first message 214-1 to the server system 16 over link 15. At operation 404, the server system 16 may extract the first user information 218-1 from the first message 214-1. At operation 406, the image modifier 300 of the server system 16 may generate a user-specific image 220-2 based on the template image 220-1 and the first user information 218-1.

In a first example, the image modifier 300 may obtain an IP address of 62.41.255.236 from the first message 214-1, which has a binary value of 00111110001010011111111111101100. In this example, the image modifier 300 may hide the IP address in the template image 220-1 using a stenographic procedure. The template image 220-1 may comprise a plurality of pixels, where each pixel comprises a red-green-blue (RGB) color value. In this example, since the IP address comprises 32 bits, the image modifier 300 may hide the IP address in 32 pixels of the template image 220-1. The first sixteen pixels (e.g., pixels 0-15) of the template image 220-1 may have an RGB value corresponding to a first white color ((255, 255, 255) and the next sixteen pixels (e.g., pixels 16-31) may have RGB values corresponding to a first blue color ((23, 152, 193). The image modifier 300 may convert the color values of pixels 0-15 into a binary value of 111111111111111111111111 and convert pixels 16-31 into a binary value of 000101111001100011000001. In other embodiments, the color values may be cyan-magenta-yellow (CMY) values. CMY-black (CMYK) values, YCbCr values, or some other suitable color values.

According to the first example, at operation 404, the image modifier 300 may insert each bit in the series of bits representing the IP address into a corresponding pixel at a desired bit position. In various embodiments, the desired bit position may be a least significant bit (LSB) of each color value. In such embodiments, the image modifier 300 may adjust the LSB of each color value to correspond to a bit of the IP address. For example, the image modifier 300 may alter the LSB of pixel 0 to correspond to the most significant bit (MSB) of the IP address, alter the LSB of pixel 1 to correspond to the next MSB of the IP address, and so forth until the LSB of the IP address corresponds to the LSB of pixel 31. In some embodiments, the image modifier 300 may modify the pixel color values in sequence, or on a pixel-by-pixel basis. However, in most embodiments, the image modifier 300 may alter the image as a whole, for example, by converting the template image 220-1 into a number comprising the color values for each pixel in the image, and altering selected bits corresponding to LSB of each pixel's color value. The resultant color values for the user-specific image 220-2 are shown by Table 1.

TABLE 1

| Pixel Number | Color Values in Pixels of Template Image 220-1 | Color Values in Pixels of User-Specific Image 220-2 |
|---|---|---|
| 0 | 111111111111111111111111 | 111111111111111111111110 |
| 1 | 111111111111111111111111 | 111111111111111111111110 |
| 2 | 111111111111111111111111 | 111111111111111111111111 |
| 3 | 111111111111111111111111 | 111111111111111111111111 |
| 4 | 111111111111111111111111 | 111111111111111111111111 |
| 5 | 111111111111111111111111 | 111111111111111111111111 |
| 6 | 111111111111111111111111 | 111111111111111111111111 |
| 7 | 111111111111111111111111 | 111111111111111111111110 |
| 8 | 111111111111111111111111 | 111111111111111111111110 |
| 9 | 111111111111111111111111 | 111111111111111111111110 |
| 10 | 111111111111111111111111 | 111111111111111111111111 |
| 11 | 111111111111111111111111 | 111111111111111111111110 |

TABLE 1-continued

| Pixel Number | Color Values in Pixels of Template Image 220-1 | Color Values in Pixels of User-Specific Image 220-2 |
|---|---|---|
| 12 | 11111111111111111111111 | 11111111111111111111111 |
| 13 | 11111111111111111111111 | 11111111111111111111110 |
| 14 | 11111111111111111111111 | 11111111111111111111110 |
| 15 | 11111111111111111111111 | 11111111111111111111111 |
| 16 | 000101111001100011000001 | 000101111001100011000001 |
| 17 | 000101111001100011000001 | 000101111001100011000001 |
| 18 | 000101111001100011000001 | 000101111001100011000001 |
| 19 | 000101111001100011000001 | 000101111001100011000001 |
| 20 | 000101111001100011000001 | 000101111001100011000001 |
| 21 | 000101111001100011000001 | 000101111001100011000001 |
| 22 | 000101111001100011000001 | 000101111001100011000001 |
| 23 | 000101111001100011000001 | 000101111001100011000001 |
| 24 | 000101111001100011000001 | 000101111001100011000001 |
| 25 | 000101111001100011000001 | 000101111001100011000001 |
| 26 | 000101111001100011000001 | 000101111001100011000001 |
| 27 | 000101111001100011000001 | 000101111001100011000000 |
| 28 | 000101111001100011000001 | 000101111001100011000001 |
| 29 | 000101111001100011000001 | 000101111001100011000001 |
| 30 | 000101111001100011000001 | 000101111001100011000000 |
| 31 | 000101111001100011000001 | 000101111001100011000000 |

In the example shown by Table 1, the color values for pixels 0, 1, 7-9, 11, and 13-14 correspond to a second white color (255, 255, 254) and the color values for each of the pixels 27 and 30-31 correspond to a second blue color (23, 152, 192). Additionally, in this example LSBs in the user-specific image 220-2 may not be changed when an LSB in the template image 220-1 is the same as a corresponding bit in the user information number. In this example, because the second white and blue colors only differ from the first white and blue colors by one bit, the first white and blue colors may be indistinguishable from the second white and blue colors. In this way, the template image 220-1 may be visually indistinguishable from the user-specific image 220-2.

Although the operations of the first example describe hiding an IP address in a subset of pixels of a template image 220-1, it should be noted that the operations discussed previously may be expanded or altered in a multitude of implementations, such as by altering each pixel in a template image 220-1 to hide multiple types of user information. Additionally, in some embodiments, the image modifier 300 may alter the two least significant bits (TLSBs) rather than the LSB of each pixel color value. Furthermore, in some embodiments, rather than hiding the binary value of user information in the template image 220-1, the image modifier 300 may input the first user information 214-1 into an encryption algorithm that outputs a series of bits having a desired length and/or a desired number of bits. In such embodiments, the server system 16 may hide the series of bits output by the encryption algorithm in the template image 220-1 in a same or similar manner as discussed in the first example.

In various embodiments, the image modifier 300 may encode or embed the first user information 218-1 in the template image 220-1 using a compression operation, which may be performed in addition to or alternative to using a stenographic procedure discussed previously. In a second example, the image modifier 300 may compress the template image 220-1 using a JPEG codec. In this example, the image modifier 300 may convert the pixels of the template image 220-1 from an RGB color space to a $Y'C_BC_R$ color space, where Y' is a luma component, $C_B$ is a blue-difference chroma component and $C_R$ is a red-difference chroma component. As an example, pixels 0-15 in the previously described pixel set may be converted from the RGB value of (255, 255, 255) to a $Y'C_BC_R$ value of (235, 128, 128), and pixels 16-31 may be converted from the RGB value of (23, 152, 192) to a $Y'C_BC_R$ value of (117, 165, 69). In some embodiments, the image modifier 300 may split the template image 220-1 into a set of blocks (or "macroblocks") including multiple pixels (e.g., 8×8 macroblocks, 16×16 macroblocks, etc.). In some embodiments, data of the chroma components $C_B$ and/or $C_R$ may also be reduced for more efficient compression.

After the RGB values are converted into $Y'C_BC_R$ values, the image modifier 300 may perform a discrete cosine transform (DCT) on each component of each $Y'C_BC_R$ value to obtain an array or matrix of DCT coefficients. In most JPEG compression operations, each DCT coefficient in the matrix is typically a decimal integer. In embodiments, the server system 16 implementing the image modifier 300 may store the user information in the DCT coefficients. For example, the image modifier 300 may convert each DCT coefficient into binary and alter the LSB of each DCT coefficient to correspond to a bit in the IP address discussed in the first example. After the DCT coefficients are adjusted to include the user information, the image modifier 300 may perform quantization, zig-zag scanning, and entropy encoding according to known methods.

Although the operations discussed with regard to the second example are described as being performed during a JPEG compression operation, the example embodiments may be applicable or expanded to embed user information in template images using one or more other compression operations. Furthermore, the operations of the second example may be expanded or altered in a multitude of implementations, such as by altering each DCT coefficient in a template image to encode multiple types of user information in the template image. Additionally, in some embodiments, the image modifier 300 may alter the two least significant bits (TLSBs) of each DCT coefficient rather than the LSB of each DCT coefficient. Furthermore, in some embodiments, rather than encoding the binary value of user information in the template image, the image modifier 300 may convert the user information into binary, decimal, or hexadecimal values, and input these values into an encryption algorithm that outputs a series of bits having a desired length or a desired number of bits. In such embodiments, the server system 16 may encode the series of bits output by the encryption algorithm in the template image in a same or similar manner as discussed in the second example.

Referring back to FIG. 2B, in response to the first message 214-1, at operation 408 the server system 16 (using the network interface 20) may send a second message 214-2 to the user system 12. The second message 214-2 may include the login page 216 and the user-specific image 220-2 (or a reference to where the user-specific image 220-2 may be obtained). Once received, at operation 410 the user system 12 may render the login page 216 and the user-specific image 220-2 in a browser or application container of application 210.

Once rendered/loaded, at operation 412 the user of the user system 12 may utilize graphical control elements (e.g., one or more text boxes/fields, radio buttons, etc.) of the login page 216 to provide authentication credentials 217 and the rendered image 220-3 to the server system 16 in a third message 214-3. The authentication credentials 217 may be obtained from the DB 205 and/or the input system 12C. In various embodiments, the login page 216 may include code or scripts that obtains the rendered image 220-3 from local storage (e.g., DB 205) and instructs the user system 12 to send the rendered image 220-3 to the server system 16. In embodiments, the rendered image 220-3 may be a version of the user-specific image 220-2 that is rendered in the browser or application container implemented by the user system 12. In some embodiments, rather than providing the rendered image 220-3 itself, the login page 216 may include code/scripts that instructs the user system 12 to convert the rendered image 220-3 into a number (also referred to as a "rendered image number"), which may be provided with the authentication credentials 217. The rendered image number may be binary, decimal, hexadecimal, or in some other suitable radix. In some embodiments, the user system 12 may encrypt the rendered image number prior to inserting it in the third message 214-3. In various embodiments, the third message 214-3 may be an HTTP message and the authentication credentials 217 and the rendered image 220-3 (or rendered image number) may be provided to the server system 16 in a body field of the HTTP message. The HTTP message may also include second user information 218-2 in one or more HTTP header fields, which may be the same or similar type of user information discussed previously.

At operation 414, the server system 16 may extract the second user information 218-2 from the third message 214-3 and extract third user information from the rendered image 220-3. In embodiments the verifier 305 may extract the second user information 218-2 from one or more HTTP header fields of the third message 214-3. In some embodiments, the verifier 305 may extract the second user information 218-2 from the authentication credentials 217 (e.g., a subject identifier (ID) from a digital certificate).

In embodiments where the third message 214-3 includes a rendered image number rather than the rendered image 220-3, the verifier 305 may extract the rendered image number for verifying the user system 12 at operation 416, which may include decrypting the rendered image number. In embodiments where the rendered image 220-3 is sent with the third message 214-3, the image modifier 300 may extract the third user information from the rendered image 220-3 and pass this information to the verifier 305. In some embodiments, the verifier 305 may extract the third user information from the rendered image 220-3.

In order to recover or extract the third user information from the rendered image 220-3, the verifier 305 (or image modifier 300) may perform the aforementioned operations of the first and/or second examples in reverse. For instance, in the first example, since the verifier 305 (or image modifier 300) knows which pixels were used to hide the first user information 218-1 in the template image 220-1, the verifier 305 (or image modifier 300) may identify corresponding pixels in the rendered image 220-3 (or a numeric representation of the rendered image 220-3), and may obtain the color values from the identified pixels. The verifier 305 may convert the color values in each identified pixel into binary values, and identify bits located at the desired bit position (e.g., the LSB of the color value for each pixel 0-31 in the first example). The verifier 305 (or image modifier 300) may then group the identified bits to form a series of bits representing the third user information (e.g., an IP address in the first example).

In the second example, the verifier 305 (image modifier 300 and/or a decoder implemented by the server system 16) may decode the rendered image 220-3 to identify the DCT coefficients (e.g., in matrix form) from the rendered image 220-3. In embodiments, the DCT coefficients may be converted into binary values, and bits located at the desired bit position (e.g., the LSB of each DCT coefficient) may be extracted and grouped together to form a series of bits representing an IP address. The verifier 305 (image modifier 300 and/or decoder) may then perform the typical decoding operations, such as taking the entry-for-entry dot product of each DCT coefficient, perform an inverse DCT operation on the DCT matrix, and adding 128 to each obtained value, etc.

At operation 416, the verifier 305 of the server system 16 may verify the user system 12 based on the extracted third user information. In some embodiments, the verifier 305 may compare the third user information with the second user information 218-2 (e.g., an IP address from a user agent string, a subject ID in a digital certificate, or the like). In some embodiments, the verifier 305 may also use previously stored user information for a backup or secondary authentication procedure. The previously stored user information may information associated with the user system 12, which was obtained during an initial registration process, included in a user profile associated with the user system 12, and/or the like. The secondary authentication may include comparing the previously stored user information with the third user information after the third user information is compared with the second user information 218-2. At operation 418, the verifier 305 may verify the authentication credentials 217 according to known methods/procedures.

When the user system 12 is authenticated by the server system 16, at operation 420 the server system 16 may send a fourth message 214-4 to the user system 12. The fourth message 214-4 may comprise a verification response (e.g., success or failure, a reason for the failure, etc.) and/or webpage(s) 222. The fourth message 214-4 may be used to establish a session with the user system 12 and/or provide services to the user system 12. In this regard, the server system 16 may serve the webpage(s) 222 to the user system 12, which may include a home page and/or an interface for accessing a tenant space for rendering in a browser or application container. The fourth message 214-4 and/or the webpage(s) 222 may include sensitive information 224 associated with the user system 12, the tenant space, etc.

While FIG. 2B shows specific operations in a particular order, in various embodiments, the operations depicted by FIG. 2B may be re-ordered, separated into additional operations, combined, or omitted altogether. For example, in some embodiments the server system 16 implementing the image modifier 300 may modify the template image 220-1 using first user information 218-1 obtained when the user system loads the login page 216. In such embodiments, the server system 16 may provide login page (e.g., operation 408) prior to generating the user-specific image 220-2 (e.g., operation 406), and the user specific image 220-2 may be provided to the user system 12 during the loading/rendering process. Alternatively, the server system 16 may store the user-specific image 220-2 in a location where the user system 12 is to obtain the user-specific image 220-2 during the loading/rendering process.

Figure 3A:
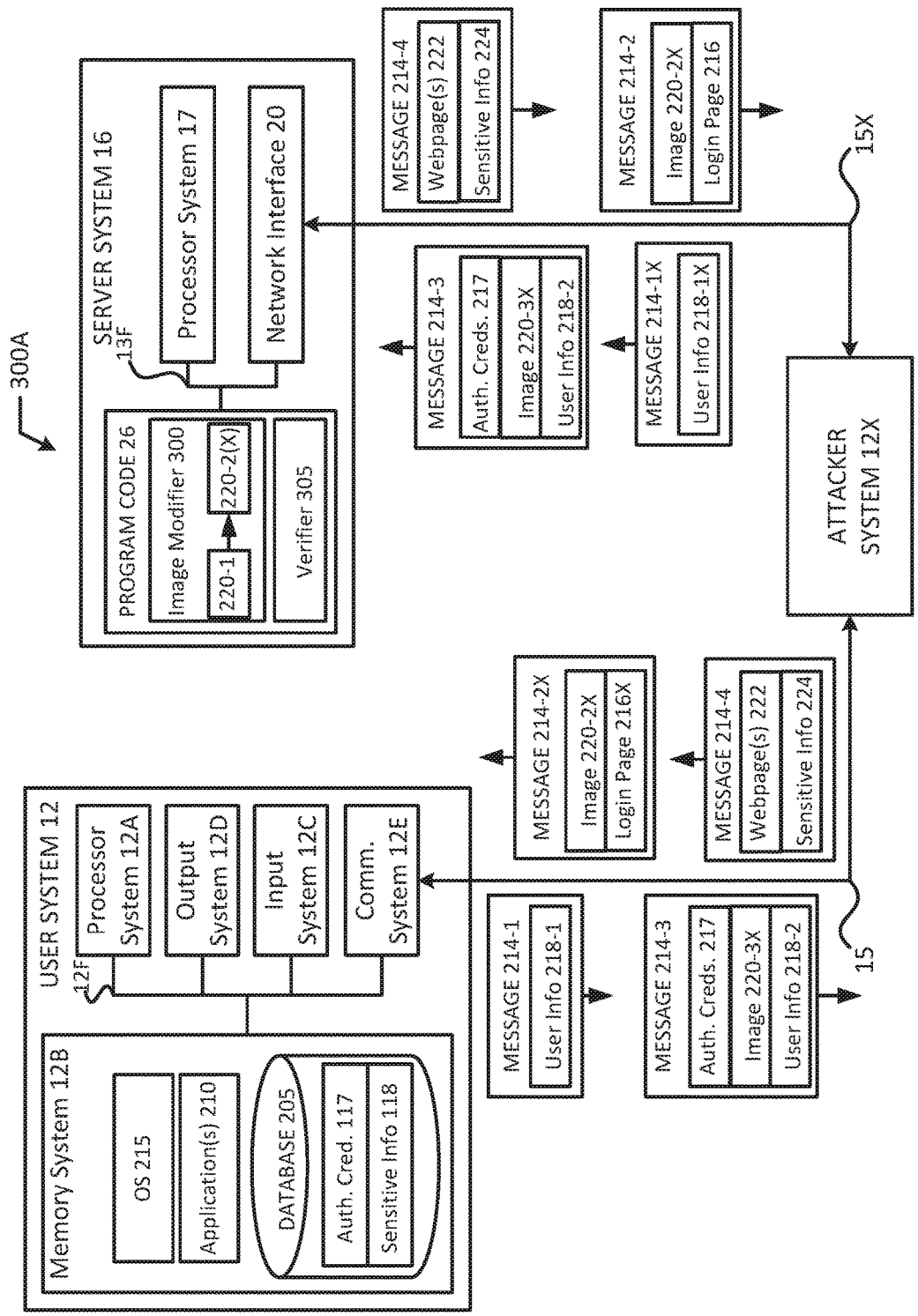
FIG. 3A shows an arrangement in which the components of a user system interact with components of the server system and with an attacker system, in accordance with various example embodiments.

FIG. 3A shows an arrangement 300A in which the components of a user system 12 interact with components of the server system 16 and with an attacker system 12X, in accordance with various example embodiments. As shown by FIG. 3A, the user system 12 and the server system 16 may include similar components as shown by FIG. 2A, such as the processor system 12A, the memory system 12B, the input system 12C, the output system 12D, the communications system 12E, the network interface 20, processor system 17, and program code 26, each of which may operate in a same or similar manner as discussed with regard to FIG. 2A. However, according to the example embodiment shown by FIG. 3A, the attacker system 12X intercept and/or relay communications between user system 12 and server system 16. Although not shown by FIG. 3A, in various embodiments the attacker system 12X may include the same or substantially similar components as the user system 12.

Figure 3B:
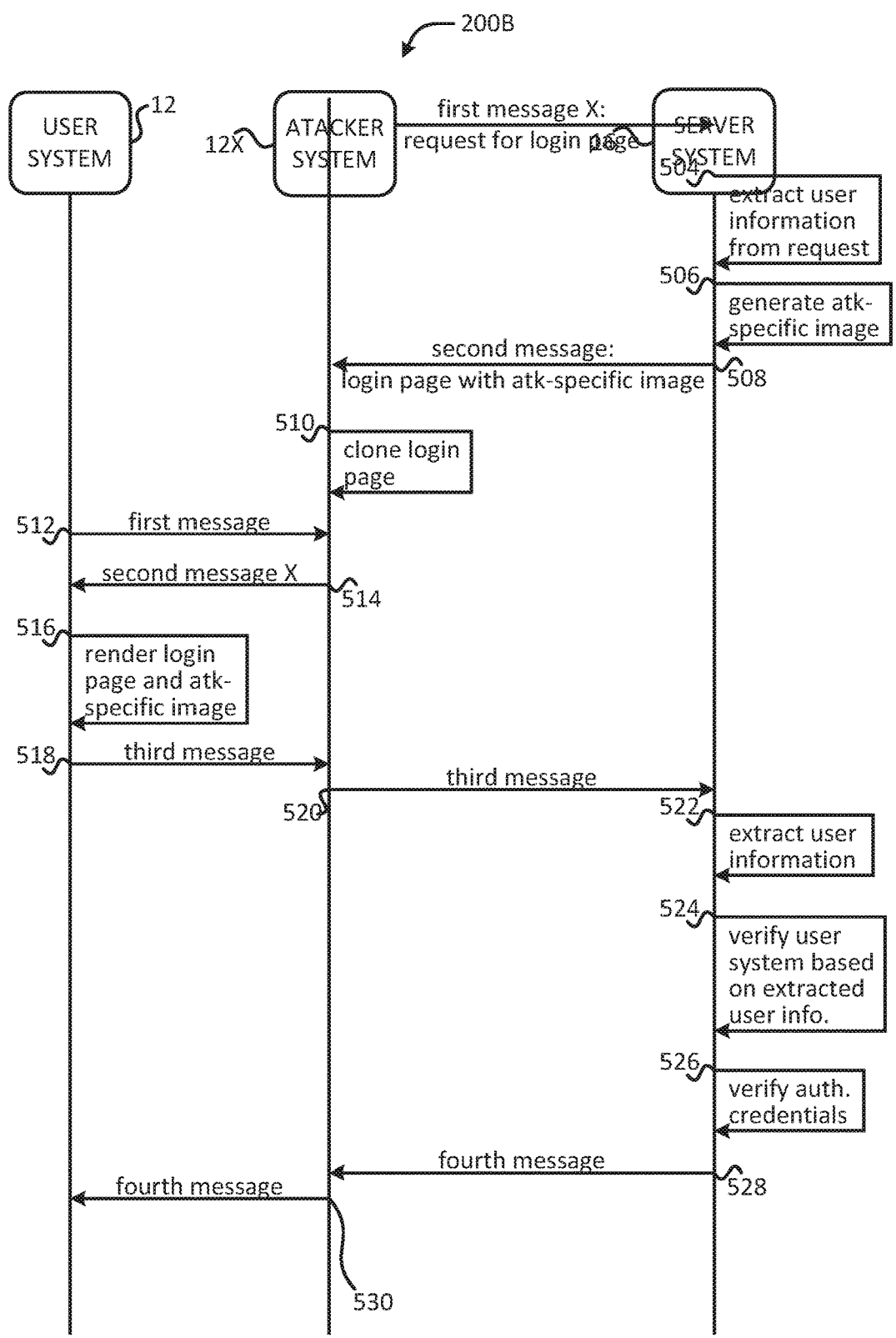
FIG. 3B illustrates a process for identifying a phishing attack and an attacker system in the arrangement of FIG. 3A, in accordance with various embodiments.

FIG. 3B illustrates a process 300B for identifying a phishing attack and the attacker system 12X, in accordance with various embodiments. For illustrative purposes, the operations of process 300B are described as being performed by the elements of the user system 12, attacker system 12X, and the server system 16 in arrangement 300A of FIG. 3A. While FIG. 3B shows specific operations in a particular order, in various embodiments, the operations depicted by FIG. 3B may be re-ordered, separated into additional operations, combined, or omitted altogether. Referring to FIGS. 3A and 3B, the process 300B may operate as follows.

At operation 502, an attacker system 12X may send a first message 214-1X to the server system 16 via link 15X for the purposes of cloning the login page 216. Based on the first message 214-1X, at operation 504 the server system 16 may obtain user information 218X associated with the attacker system 12X. The server system 16 may extract the user information 218X from the first message 214-1X in the same or similar manner as discussed previously with regard to FIGS. 2A-2B. In some cases, the attacker system 12X may implement a website cloning tool to send the first message 214-1X for the login page 216. In response to the first message 214-1X (or during a loading/rendering process for the login page 216), at operation 506 the server system 16 may modify a template image 220-1 to produce an attacker (atk)-specific image 220-2X. The atk-specific image 220-2X may include the user information 218X. The template image 220-1 may be modified in the same or similar manner as discussed previously with regard to FIGS. 2A-2B. After the template image is modified, at operation 508 the server system 16 may send the user-specific image 220-2X to the attacker system 12X in a second message 214-2.

At operation 510, the attacker system 12X may generate a cloned login page 216X that includes the atk-specific image 220-2X. The cloned login page 216X may have an almost-identical appearance as the login page 216, which may trick some users into thinking that the cloned login page 216X is being hosted by the server system 16. In some embodiments, the cloned login page 216X may be a cloned mobile application (e.g., a cloned native, hybrid, or web application) that has an almost-identical appearance as a mobile application published by the server system 16. The attacker system 12X may also have included code or scripts in the cloned login page 216X (or cloned mobile application), which will obtain the third message 214-3 from the user system 12 and store the authentication credentials 217 locally at the attacker system 12X or at a remote server/storage location. The attacker system 12X may later use the authentication credentials 217 to access the sensitive information 224. The code/scripts may also redirect the user system 12 to the server system 16 by forwarding messages (e.g., the second message 214-2) to the server system 16.

Typically, after the message is sent to the server system 16, the user system 12 may interact directly with the server system 16 to obtain webpage(s) 222 (not shown by FIGS. 3A-3B). In some cases, as shown by FIGS. 3A-3B, upon authentication of the user system 12, the attacker system 12X may obtain webpage(s) 222 and/or the sensitive information 224 from the server system 16, and may forward the webpage(s) 222 and/or the sensitive information 224 to the user system 12. In either scenario, the attacker system 12X may forward the entire contents of messages obtained from the user system 12 to the server system 16 to appear as though the user system 12 is directly communicating with the server system 16. Similarly, the attacker system 12X may forward the entire contents of messages obtained from the server system 16 to the user system 12 to appear as though the server system 16 is directly communicating with the user system 12.

The attacker system 12X may host the cloned login page 216X, and at some time in the future, the attacker system 12X may serve the cloned login page 216X to the user system 12. At operation 512, the user system 12 may send the first message 214-1, including a request for the login page 216, to the attacker system 12X. In many scenarios, when a user of the user system 12 uses application 210 (or a browser) to access the server system 16, the user system 12 may inadvertently access the cloned login page 216X by sending the first message 214-1 to the attacker system 12X or to the location from which the cloned login page 216X is hosted. The user system 12 may be directed to the cloned login page 216X by selecting a link in a spoofed email sent by the attacker system 12X, typing in a domain name with a common typographical error that is hosted or controlled by the attacker system 12X, or the attacker system 12X may register a same domain name in a different top-level domain (TLD). In some cases, the attacker system 12X may intercept the first message 214-1 and redirect the user system 12 to a domain of the cloned login page 216X (which may be a type of "pharming"). The user system 12 may be directed to the cloned login page 216X according to any other means.

Either way, in response to the first message 214-1, at operation 514 the attacker system 12X may send the cloned login page 216X to the user system 12 in a second message 214-2X. At operation 516, the processor system 12A may implement the application 210 (or browser) to render/load the cloned login page 216X, which may include rendering the atk-specific image 220-2X that is unique to the attacker system 12X. Once the cloned login page 216X is rendered/loaded, at operation 518 the user of the user system 12 may utilize graphical control elements of the cloned login page 216X to generate and send a third message 214-3 to the attacker system 12X. The third message 214-3 may include the authentication credentials 217 and the rendered image 220-3. At operation 520, the attacker system 12X may forward the third message 214-3, including the authentication credentials 217 and the rendered image 220-3X, to the server system 12. In some embodiments, the attacker system 12X may store the authentication credentials 217 in an associated data storage (not shown).

In response to receipt of the authentication credentials 217 and the rendered image 220-3X, at operation 522, the verifier 305 (or image modifier 300) implemented by the processor system 17 may extract third user information from the rendered image 220-3X. The verifier 305 (or image modifier 300) may extract the third user information from the rendered image 220-3X in a same or similar manner as discussed previously with regard to FIGS. 2A-2B.

At operation 524, the verifier 305 may attempt to verify/authenticate the user system 12 based on the extracted user information. Since the attacker system 12X will likely forward the entire third message 214-3 to the server system 16, the message will likely include second user information 218-2 associated with the user system 12. Therefore, when the verifier 305 compares the second user information 218-2 with the third user information extracted from the rendered image 220-3X, the verifier 305 may determine that the second user information 218-2 does not match the third user information. Based on the mismatched second and third user information, the verifier 305 may indicate to other components/systems of the server system 16 that an attacker is likely present. In embodiments, the verifier 305 may store the extracted third user information for later identification of the attacker system 12X and/or its location.

At operation 526, the server system 16 may authenticate the user system 12 using the authentication credentials 217. At operation 528, the server system may send a fourth message 214-4 to the attacker system 12X, which may be forwarded to the user system 12 at operation 530. The fourth message 214-4 may be the same or similar as the fourth message 214-4 discussed previously with regard to FIGS. 2A-2B. In various embodiments, the server system 16 may still establish a session with the user system 12 and/or provide services to the user system 12 even though a phishing attack has been detected. This may be done so that the attacker system 12X does not become aware of its detection, which may reduce the likelihood that the user of the attacker system 12X destroys evidence of the phishing attack. In other embodiments, the server system 16 may prevent access to the server system 16 when the attacker system 12X is detected.

Figure 4:
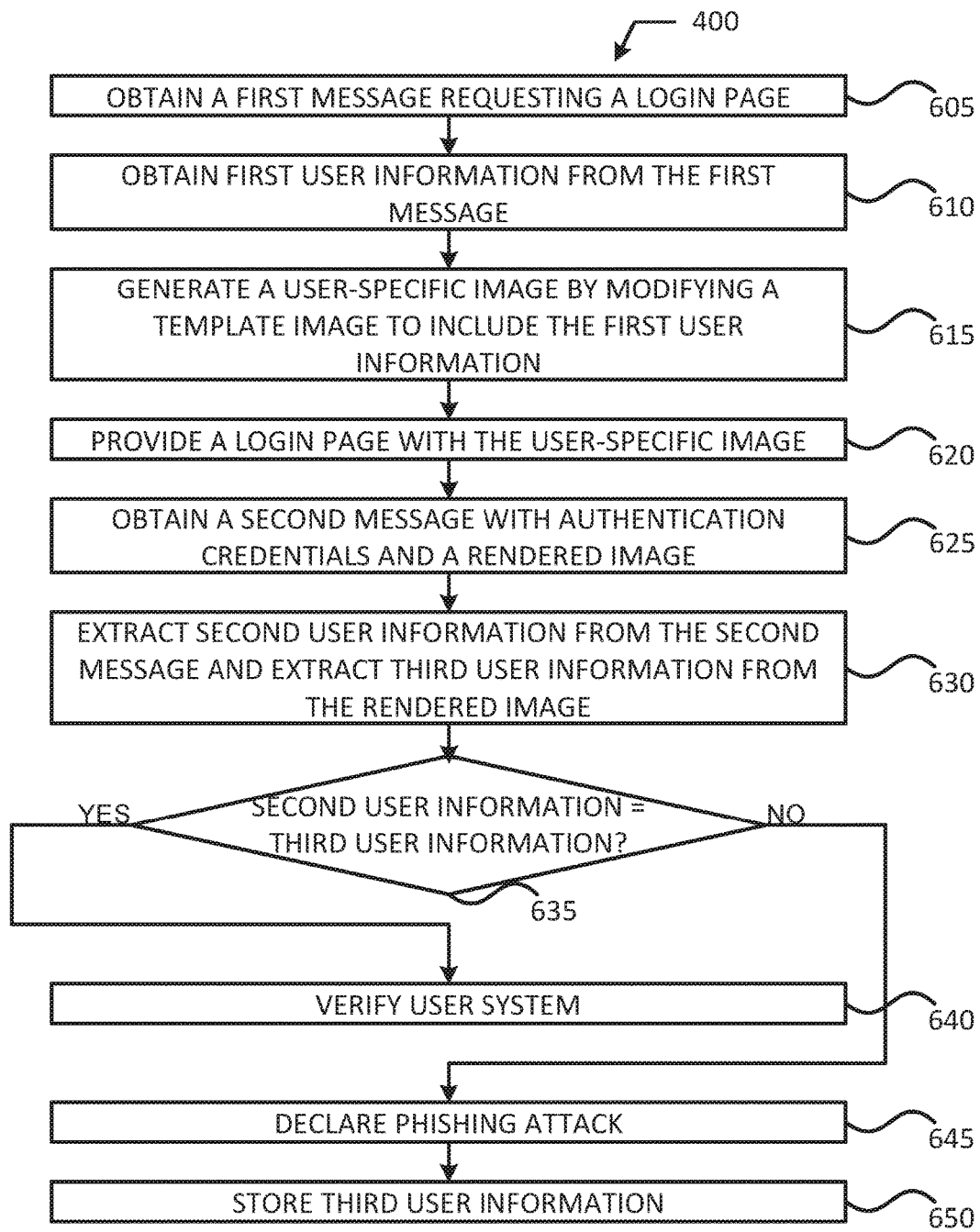
FIG. 4 illustrates a process for detecting phishing attacks, in accordance with various example embodiments.

FIG. 4 illustrates a process 400 for detecting phishing attacks, in accordance with various example embodiments. For illustrative purposes, the operations of process 400 are described as being performed by server system 16 discussed with regard to FIGS. 1A-B, 2A, and 3A. However, it should be noted that other computing devices may operate the process 400 in a multitude of implementations, arrangements, and/or environments. In embodiments, the server system 16 may include program code 26, which when executed by the processor system 17, causes the server system 16 to perform the various operations of process 400. While particular examples and orders of operations are illustrated in FIG. 4, in various embodiments, these operations may be re-ordered, separated into additional operations, combined, or omitted altogether.

Referring to FIG. 4, at operation 605, the server system 16 may obtain a first message from a user system 12. The first message may be a request for a login page used for accessing the server system 16. At operation 610, the server system 16 may obtain, identify, or extract first user information from the first message. At operation 615, the server system 16 may generate a user-specific image by modifying a template image to include the first user information. In embodiments, the server system 16 may determine a user information number based on a numeric representation of the first user information, and encrypt the user information number. In embodiments, server system 16 may perform a stenographic procedure on the template image to hide the encrypted user information number in a set of pixels of the template image, and/or the server system 16 may encode the template image with the encrypted user information number during a compression operation.

In embodiments, the stenographic procedure may include determining a numeric representation of the template image; adjusting bits located at desired bit positions in the numeric representation of the template image to match bits of a corresponding portion of the encrypted user information number; and generating the user-specific image using the numeric representation of the template image with the adjusted bits as a color scheme. In embodiments, the desired bit position may be an LSB position or TLSBs positions of each of color value of each pixel.

In embodiments, encoding the template image with the user information number may include splitting or dividing the template image into a plurality of blocks; determining a numeric representation of each block of the plurality of blocks; performing a DCT on each block to obtain an array of DCT coefficients; adjusting bits located at desired bit positions in each of the DCT coefficients to match bits of a corresponding portion of the encrypted user information number; and generating the user-specific image by performance of a quantization operation and an entropy encoding operation on the array of with the adjusted DCT coefficients. In embodiments, the desired bit positions may be an LSB position or TLSBs positions of each of the DCT coefficients.

At operation 620, the server system 16 may provide the login page with the user-specific image to the user system 12, which may be rendered by a browser or application container of the user system 12. At operation 625, the server system 16 may obtain a second message comprising authentication credentials and a rendered image. The rendered image may be a version of the user-specific image as rendered by the user system 12.

At operation 630, the server system 16 may extract second user information from the second message and may extract third user information from the rendered image. In embodiments, the server system 16 may perform the stenographic operation and/or the compression operation in a reverse order in order to extract the third user information. In embodiments, extracting the third user information may include identifying the desired bit positions within the numeric representation of the rendered image; obtaining numerals located at the identified desired bit positions; and grouping the removed numerals together to obtain a numeric representation of the third user information; and decrypting the numeric representation of the third user information. In some embodiments, the server system 16 may convert the decrypted numeric representation of the extracted user information into the extracted user information (e.g., decimal values and/or ASCII characters).

At operation 635, the server system 16 may determine whether the second user information matches the extracted third information. In embodiments, the server system 16 may compare a numeric representation of the second user information with the decrypted numeric information that is representative of the third user information. In embodiments where the server system 16 converts the decrypted numeric representation of the extracted user information into the extracted user information, the server system may compare the second user information with the converted version of the third user information.

If at operation 635, the server system determines that the second user information matches the third user information, the server system 16 may proceed to operation 640 to verify the user system 12. In embodiments, the server system 16 may authenticate the user system 12 using the authentication credentials obtained in the first message and may serve one or more webpages to the user system 12.

If at operation 635, the server system determines that the second user information does not match the third user information, the server system 16 may proceed to operation 645 to declare that a phishing attack has occurred. At operation 650, the server system 16 may store the third user information, which may be used to locate and/or identify an attacker who has performed the phishing attack. The process 400 may repeat as necessary or end.

Figure 5:
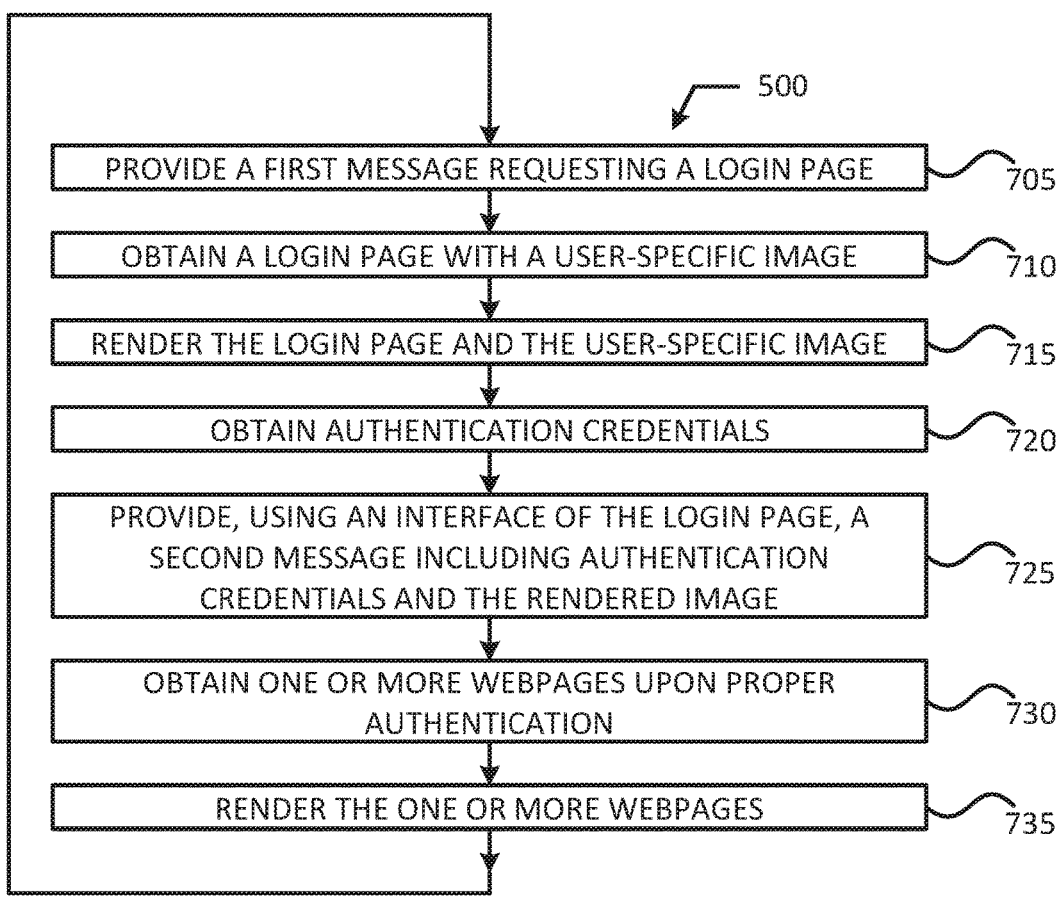
FIG. 5 illustrates another process for authenticating a user system, in accordance with various example embodiments.

FIG. 5 illustrates a process 500 for authenticating a user system, in accordance with various example embodiments. For illustrative purposes, the operations of process 500 will be described as being performed by user system 12 discussed with regard to FIGS. 1A-B, 2A, and 3A. However, it should be noted that other computing devices may operate the process 500 in a multitude of implementations, arrangements, and/or environments. In embodiments, the user system 12 may include program code, which when executed by the processor system 12A, causes the user system 12 to perform the various operations of process 500. While particular examples and orders of operations are illustrated in FIG. 5, in various embodiments, these operations may be re-ordered, separated into additional operations, combined, or omitted altogether.

Referring to FIG. 5, at operation 705, the user system 12 may provide a first message to a server system 16. The first message may be used to request a login page for accessing one or more services provided by the server system 16. In embodiments, the user system 12 may implement a browser or a mobile application to generate and send the first message. At operation 710, the user system 12 may obtain a login page from the server system with a user-specific image. In embodiments, the user-specific image may be a version of a template image that is modified based on first user information included with the first message. In various embodiments, the user-specific image may have a color scheme that is different and imperceptible (e.g., using the human visual system) than a color scheme of the template image.

At operation 715, the user system 12 may render the login page and the user-specific image in the browser or a container of the mobile application. In embodiments, the login page may also include a user interface comprising a plurality of graphical control elements. Some of the graphical control elements may be used to obtain authentication credentials at operation 720 and provide the authentication credentials and the rendered image to the server system 16 in a second message at operation 725. In some embodiments, the user system 12 may convert the rendered image into a number according to instructions, code, or scripts included in the login page, encrypt the number, and include the encrypted number in the second message.

At operation 730, the user system 12 may obtain one or more webpages upon proper authentication of the user system 12. In embodiments, the user system 16 may be authenticated by the server system 16 based on the second user information included in the second message and third user information embedded in the rendered image or the encrypted number. At operation 735, the user system 12 may render the one or more webpages in the browser or the container. The process 500 may repeat as necessary or end.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2®, by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A computer program for detection of phishing attacks to be stored by one or more non-transitory computer-readable media of a server system, the computer program comprising a set of instructions, wherein execution of the set of instructions by a hardware processor system of the server system is to cause the server system to:
    obtain, from a user system, a first message comprising a request for a login page and first user information associated with the user system other than authentication credentials for accessing a platform provided by the server system;
    modify, based on the first user information, a first image to obtain a second image;
    provide, to the user system in response to the first message, a second message comprising the login page and the second image;
    obtain, from the user system, a third message comprising the authentication credentials for accessing the platform, second user information other than the authentication credentials, and a third image, wherein the third image is a version of the second image as rendered by the user system; and
    authenticate the user system using the authentication credentials and based on the second user information and third user information embedded in the third image, the third user information not including the authentication credentials.

2. The computer program of claim 1, wherein to modify the first image, the set of instructions is operable to:
    determine a user information number based on a numeric representation of the first user information; and one or both of:

perform a stenographic procedure on a first image to hide the user information number in a set of pixels in the first image; or encode the first image with the user information number during a compression operation of the first image.

3. The computer program of claim 2, wherein to perform the stenographic procedure, the set of instructions is operable to:

adjust bits located at desired bit positions in a first number to match bits of a corresponding portion of the user information number, wherein the first number with the adjusted bits is a second number, and wherein the first number is a numeric representation of the first image and the second number is a numeric representation of the second image.

4. The computer program of claim 3, wherein the desired bit positions comprise a least significant bit (LSB) of each of color value of each pixel in the set of pixels.

5. The computer program of claim 2, wherein to encode the first image with the user information number, the set of instructions is further operable to:

apply a discrete cosign transform (DCT) on a first number to obtain an array of DCT coefficients, wherein the first number is a numeric representation of the first image; and adjust bits located at desired bit positions in each of the DCT coefficients to match bits of a corresponding portion of the user information number, wherein the array with the adjusted DCT coefficients is a second number, and wherein the second number is a numeric representation of the second image.

6. The computer program of claim 5, wherein the desired bit positions are an LSB position of each of the DCT coefficients.

7. The computer program of claim 1, wherein to authenticate the user system, the set of instructions is operable to:

extract the second user information from the third message;

extract the third user information from the third image; and determine whether the second user information matches the third user information.

8. The computer program of claim 7, wherein to extract third user information from the third image, the set of instructions is operable to:

identify desired bit positions within a numeric representation of the third image;

obtain numerals located at the desired bit positions;

group the removed numerals together to obtain a numeric representation of the third user information; and convert the numeric representation of the third user information into the third user information.

9. The computer program of claim 2, wherein the set of instructions is further operable to:

encrypt the user information number, wherein to perform the stenographic procedure, the set of instructions is further operable to hide the encrypted user information number in the set of pixels, wherein to encode the first image, the set of instructions is further operable to encode the first image with the encrypted user information number during the compression operation, and wherein to authenticate the user system, the set of instructions is further operable to decrypt the numeric representation of the third user information to obtain the third user information.

10. The computer program of claim 1, wherein the first user information and the second user information comprises one or more of an internet IP address of the user system, an operating system (OS) implemented by the user system, a version of the OS, a browser used to send the request, a version of the browser, a browser window size, a rendering engine implemented by the browser, a version of the rendering engine, a time that the request was submitted, a time zone in which the user system is located, a screen resolution of the user system, and a device type of the user system, and the authentication credentials comprise one or more of a user name, a password, a personal identification number (PIN), a digital certificate, and biometric data.

11. A computer program to authenticate a user system to be stored by one or more non-transitory computer-readable media of the user system, the computer program comprising a set of instructions, wherein execution of the set of instructions by a hardware processor system of the user system is to cause the user system to:

provide, to a server system, a first message to request a login page, wherein the first message comprises user information associated with the user system;

obtain, from the server system in response to the request message, a second message comprising the login page with a user-specific image, wherein the user-specific image is a version of a template image that is modified based on the user information, and wherein the user-specific image has a color scheme that is different and imperceptible than a color scheme of the template image;

render, in an application container implemented by the user system, the login page including the user-specific image; and provide, to the server system via an interface of the login page, a third message comprising authentication credentials and a rendered image, wherein:

the rendered image is a version of the user-specific image as rendered in the application container, and the rendered image and the authentication credentials are to be used by the server system to authenticate the user system.

12. The computer program of claim 11, wherein the third message further comprises second user information, and the user system is to be authenticated based on the second user information and third user information embedded in the rendered image.

13. The computer program of claim 12, wherein the set of instructions is operable to:

obtain, from the server system, a homepage to be rendered in the application container upon proper authentication of the user system.

14. The computer program of claim 11, wherein the template image comprises a plurality of pixels, wherein each pixel of the plurality of pixels has a corresponding color value, and the set of instructions is further operable to:

convert the rendered image into a number according to instructions included in the login page;

encrypt the number; and insert the encrypted number in the third message.

15. A server system comprising:

a communications system to:

obtain, from a user system, a first message to request a login page with first user information, send, to the user system in response to the request, a second message including the login page and a user-specific image, wherein the user-specific image is a modified version of a template image based on the first user information, and obtain, from the user system, a third message including authentication credentials, a rendered image, and second user information, wherein the rendered image is a version of the user-specific image as rendered by the user system; and a hardware processor system including a memory device, the hardware processor system communicatively coupled with the communication system, and the hardware processor system is to:

generate the user-specific image by modification of the template image to include the first user information, wherein the user-specific image has a color scheme that is different and imperceptible than a color scheme of the template image, extract second user information from the third message, and extract third user information from the rendered image, and authenticate the user system based on the authentication credentials and the second and third user information.

16. The server system of claim 15, wherein to modify the template image, the hardware processor system is to:

determine a user information number based on a numeric representation of the first user information;

encrypt the user information number; and one or both of:

perform a stenographic procedure on the template image to hide the encrypted user information number in a set of pixels of the template image; or encode the template image with the encrypted user information number during a compression operation of the template image.

17. The server system of claim 16, wherein to perform the stenographic procedure, the hardware processor system is to:

determine a numeric representation of the template image;

adjust bits located at desired bit positions in the numeric representation of the template image to match bits of a corresponding portion of the encrypted user information number; and generate the user-specific image using the numeric representation of the template image with the adjusted bits as a color scheme.

18. The server system of claim 16, wherein to encode the first image with the user information number, the hardware processor system is:

split the template image into a plurality of blocks;

determine a numeric representation of each block of the plurality of blocks;

perform a discrete cosign transform (DCT) on each block to obtain an array of DCT coefficients;

adjust bits located at desired bit positions in each of the DCT coefficients to match bits of a corresponding portion of the encrypted user information number; and generate the user-specific image by performance of a quantization operation and an entropy encoding operation on the array of the adjusted DCT coefficients.

19. The server system of claim 16, wherein to authenticate the user system, the hardware processor system is to:

identify desired bit positions within a numeric representation of the rendered image;

identify numerals located at the desired bit positions;

group the identified numerals together to obtain a numeric representation of third user information;

decrypt the numeric representation of the third user information to obtain the third user information; and determine whether the third user information matches the second user information.

* * * * *